United States Patent
Tsuchida et al.

(10) Patent No.: US 9,876,402 B2
(45) Date of Patent: Jan. 23, 2018

(54) PERMANENT MAGNET EMBEDDED ELECTRIC MOTOR, COMPRESSOR, AND REFRIGERATING AND AIR-CONDITIONING DEVICE

(71) Applicant: Mitsubishi Electric Corporation, Tokyo (JP)

(72) Inventors: Kazuchika Tsuchida, Tokyo (JP); Masahiro Nigo, Tokyo (JP); Kazuhiko Baba, Tokyo (JP); Atsushi Ishikawa, Tokyo (JP); Tomoaki Oikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 185 days.

(21) Appl. No.: 14/912,752

(22) PCT Filed: Sep. 18, 2014

(86) PCT No.: PCT/JP2014/074635
§ 371 (c)(1),
(2) Date: Feb. 18, 2016

(87) PCT Pub. No.: WO2015/045999
PCT Pub. Date: Apr. 2, 2015

(65) Prior Publication Data
US 2016/0211709 A1   Jul. 21, 2016

(30) Foreign Application Priority Data
Sep. 26, 2013   (JP) .................... PCT/JP2013/076116

(51) Int. Cl.
*H02K 1/27*   (2006.01)
*F25B 1/02*   (2006.01)
*F25B 1/04*   (2006.01)

(52) U.S. Cl.
CPC ................. *H02K 1/27* (2013.01); *F25B 1/02* (2013.01); *F25B 1/04* (2013.01); *H02K 1/2766* (2013.01); *H02K 2201/06* (2013.01)

(58) Field of Classification Search
CPC .......... H02K 1/02; H02K 1/27; H02K 1/2706; H02K 1/274; H02K 1/276; H02K 1/2766;
(Continued)

(56) References Cited

U.S. PATENT DOCUMENTS 6,147,428 A * 11/2000 Takezawa ............ H02K 1/2766
                                                              310/156.57
6,849,981 B2 * 2/2005 Kojima .................. H02K 1/276
                                                              310/156.43
(Continued)

FOREIGN PATENT DOCUMENTS

CN    204179779 U    2/2015
JP    H09-163647 A    6/1997
(Continued)

OTHER PUBLICATIONS

International Search Report of the International Searching Authority dated Dec. 9, 2014 for the corresponding international application No. PCT/JP2014/074635 (and English translation).

(Continued)

*Primary Examiner* — Tran Nguyen
(74) *Attorney, Agent, or Firm* — Posz Law Group, PLC

(57) ABSTRACT

An interior permanent magnet motor includes a stator and a rotor. The rotor includes a rotor core formed by laminating a plurality of plate members. The rotor core has a plurality of magnet insertion holes formed therein, into which corresponding permanent magnets are respectively inserted. At least one slit and at least one caulked portion are formed between a rotor outer peripheral surface of the rotor and a radially-outer insertion hole contour surface of the magnet (Continued)

insertion hole. At least a part of the caulked portion is positioned between a pair of width extended lines of the slit.

7 Claims, 15 Drawing Sheets

(58) Field of Classification Search
CPC ...... H02K 1/277; H02K 1/2773; H02K 21/12; H02K 21/14; H02K 21/16; F04C 18/34; F04C 2240/40; F04C 29/0085; F25B 1/02; F25B 1/04; F25B 31/02; F25B 31/023
USPC ......... 310/216.004, 216.009, 156.53–156.57
See application file for complete search history.

(56) References Cited

U.S. PATENT DOCUMENTS

| | | | | |
|---|---|---|---|---|
| 7,560,842 | B2* | 7/2009 | Hattori | H02K 1/2766 310/156.53 |
| 7,843,101 | B2* | 11/2010 | Ito | H02K 1/2766 310/156.46 |
| 2012/0007464 | A1* | 1/2012 | Saito | H02K 1/276 310/216.051 |
| 2012/0285004 | A1* | 11/2012 | Haruno | H02K 1/2766 29/598 |
| 2014/0091664 | A1* | 4/2014 | Aoyama | H02K 1/2766 310/156.53 |

FOREIGN PATENT DOCUMENTS

| | | |
|---|---|---|
| JP | H10-285845 A | 10/1998 |
| JP | H11-187597 A | 7/1999 |
| JP | H11-299145 A | 10/1999 |
| JP | 2001-037186 A | 2/2001 |
| JP | 2006-320200 A | 11/2006 |
| JP | 2008-167583 A | 7/2008 |

OTHER PUBLICATIONS

Office Action dated Jul. 24, 2017 issued in corresponding CN patent application No. 201480052725.3.

* cited by examiner

PERMANENT MAGNET EMBEDDED ELECTRIC MOTOR, COMPRESSOR, AND REFRIGERATING AND AIR-CONDITIONING DEVICE

CROSS REFERENCE TO RELATED APPLICATION

This application is a U.S. national stage application of PCT/JP2014/074635 filed on Sep. 18, 2014, which claims priority to International Application No. PCT/JP2013/076116 filed on Sep. 26, 2013, the contents of which are incorporated herein by reference.

TECHNICAL FIELD

The present invention relates to an interior permanent magnet motor, a compressor, and a refrigeration and air conditioning apparatus.

BACKGROUND ART

As a related-art interior permanent magnet motor, in Patent Literature 1, there is disclosed an interior permanent magnet motor in which a plurality of slits are formed on a radially outer side of a rotor with respect to magnet insertion holes. In the interior permanent magnet motor, a harmonic component of a magnetic-flux density waveform is reduced due to a function of the slit so that a harmonic of an inducted voltage and a clogging torque are reduced, thereby being capable of reducing noise and vibration.

CITATION LIST

Patent Literature

[PTL 1] JP 2008-167583 A.

SUMMARY OF INVENTION

Technical Problem

On the other hand, the rotor of the interior permanent magnet motor is formed by laminating thin magnetic steel plates. Therefore, caulked portions are required to be formed so as to fix the steel plates. Further, when the caulked portions are positioned on the radially outer side of the rotor, the steel plates can be more effectively fixed.

The present invention has been made in view of the above, and has an object to provide an interior permanent magnet motor capable of fixing plate members at caulked portions more effectively and reducing noise and vibration.

Solution to Problem

In order to achieve the above-mentioned object, according to one embodiment of the present invention, there is provided an interior permanent magnet motor, including: a stator; and a rotor rotatably arranged so as to be opposed to the stator, in which the rotor includes a rotor core formed by laminating a plurality of plate members, in which the rotor core has a plurality of magnet insertion holes formed therein, into which corresponding permanent magnets are respectively inserted, in which the plurality of magnet insertion holes are each formed into a shape that is convex toward a center side of the rotor, in which at least one slit and at least one caulked portion are formed between a rotor outer peripheral surface of the rotor and a radially-outer insertion hole contour surface of the magnet insertion hole, and in which at least a part of the caulked portion is positioned between a pair of width extended lines of the slit.

The plurality of magnet insertion holes may each be formed into a shape that is convex toward a center side of the rotor.

The entire caulked portion may be positioned between the pair of width extended lines of the slit.

A plurality of the slits may be formed between the rotor outer peripheral surface of the rotor and the radially-outer insertion hole contour surface of the magnet insertion hole, and the plurality of the slits may be arrayed in a width direction.

The caulked portion may be formed on a radially inner side with respect to the corresponding slit.

Further, in order to achieve the same object, according to one embodiment of the present invention, there is also provided a compressor. The compressor of the one embodiment of the present invention includes, in an airtight container: a motor; and a compression element. The motor is the above-mentioned interior permanent magnet motor of the one embodiment of the present invention.

Further, in order to achieve the same object, according to one embodiment of the present invention, there is also provided a refrigeration and air conditioning apparatus. The refrigeration and air conditioning apparatus of the one embodiment of the present invention includes the above-mentioned compressor of the one embodiment of the present invention as a component of a refrigeration cycle.

Advantageous Effects of Invention

According to the one embodiment of the present invention, it is possible to fix the plate members at the caulked portions more effectively and reduce noise and vibration.

DESCRIPTION OF EMBODIMENTS

Figure 1:
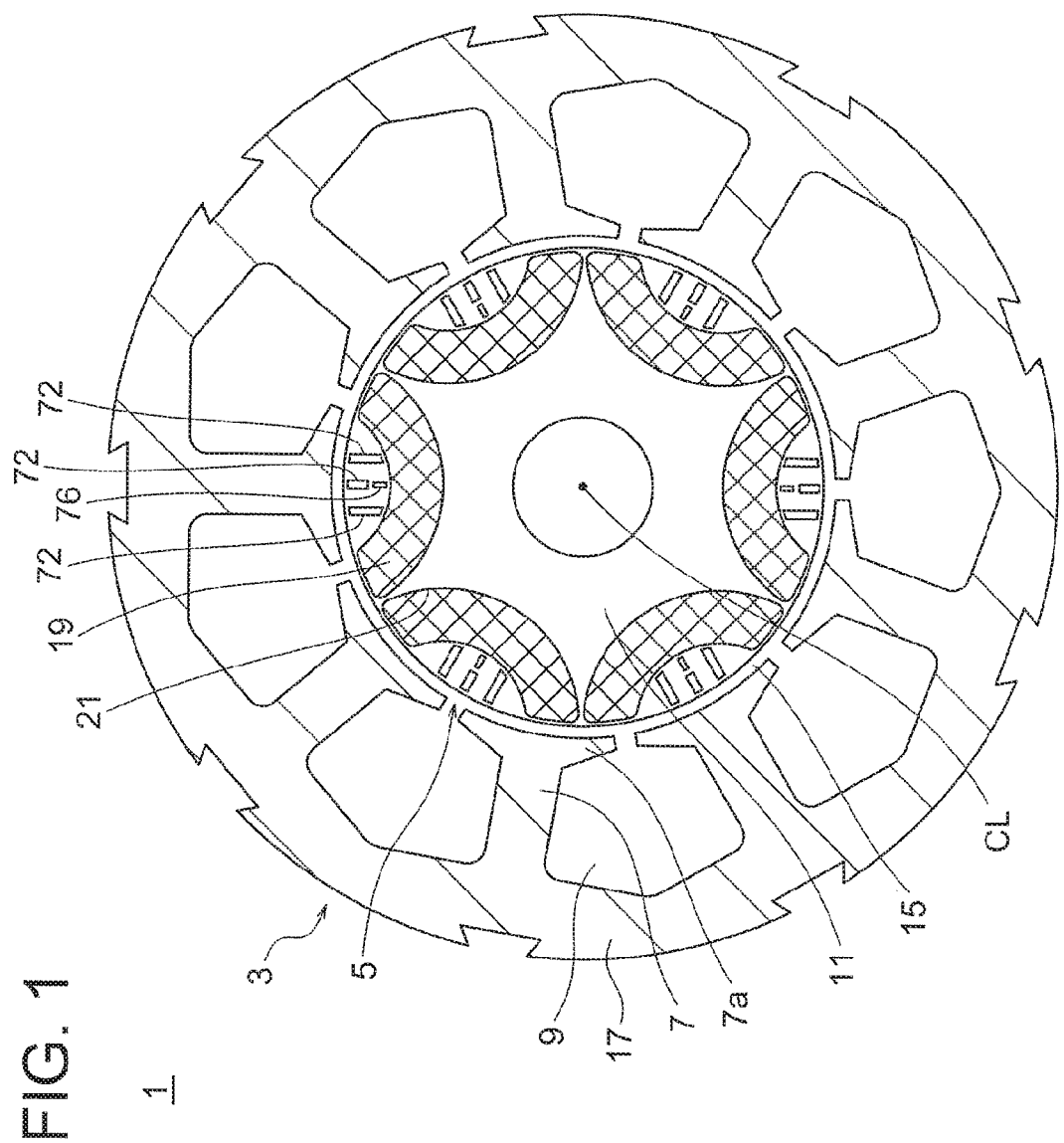
FIG. 1 is a view for illustrating a cross-section orthogonal to a rotation center line of an interior permanent magnet motor according to a first embodiment of the present invention.

Now, embodiments of the present invention are described referring to the accompanying drawings. Note that, in the drawings, the same reference symbols represent the same or corresponding parts. Note that, in FIG. 2 to FIG. 5, FIG. 7 to FIG. 11, and FIG. 14 to FIG. 21, for the sake of clarity of illustration, the hatching is omitted.

First Embodiment

Figure 2:
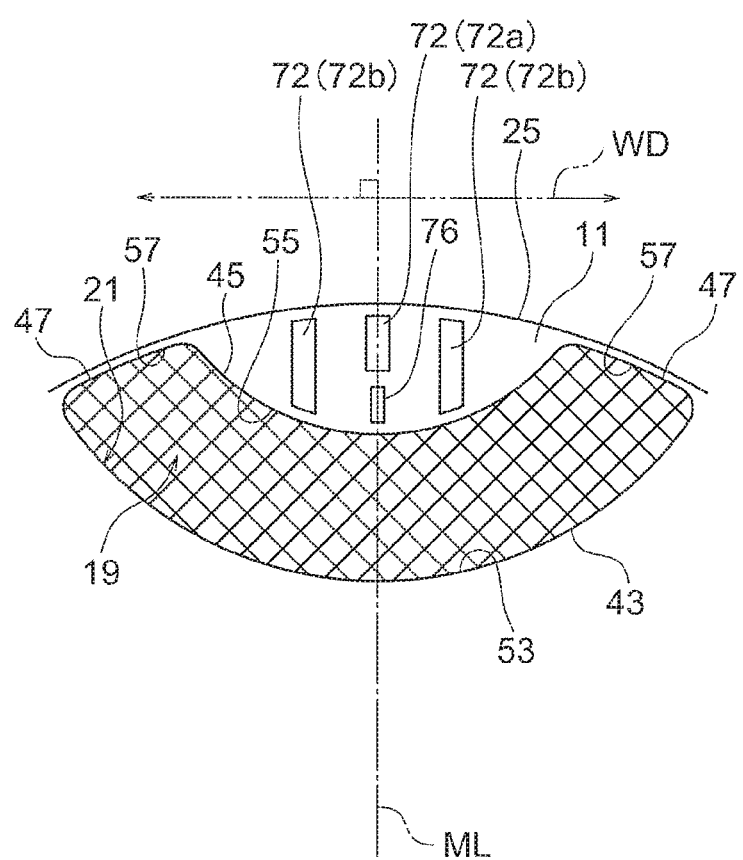
FIG. 2 is a view for illustrating a peripheral part of one permanent magnet illustrated in FIG. 1 in an enlarged mariner.
Figure 3:
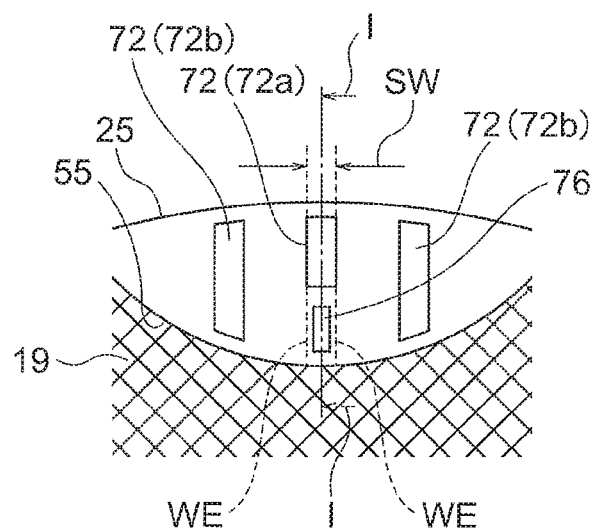
FIG. 3 is a view for illustrating a periphery of a plurality of slits illustrated in FIG. 2 in a further enlarged manner.

FIG. 1 is a view for illustrating a cross-section orthogonal to a rotation center line of an interior permanent magnet motor according to a first embodiment of the present invention. FIG. 2 is a view for illustrating a peripheral part of one permanent magnet of FIG. 1 in an enlarged manner. FIG. 3 is a view for illustrating a periphery of a plurality of slits of FIG. 2 in a further enlarged manner.

An interior permanent magnet motor 1 includes a stator 3 and a rotor 5 rotatably arranged so as to be opposed to the stator. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction. A publicly known stator winding (not shown) is wound around each of the plurality of tooth portions 7 in a publicly known manner.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor 5 and an inner peripheral surface of the stator 3.

In such a configuration, the rotor 5 is held on an inner side of the stator 3 through intermediation of the air gap 15 so as to be rotatable about a rotation center line CL (rotation center of the rotor, axial line of the shaft). Specifically, a current having a frequency synchronized with an instructed number of revolutions is supplied to the stator 3 to generate a rotation magnetic field, thereby rotating the rotor 5. The air gap 15 between the stator 3 and the rotor 5 is, for example, an air gap of from 0.3 mm to 1 mm.

Next, configurations of the stator 3 and the rotor 5 are described in detail. The stator 3 includes a stator core 17. The stator core 17 is formed by, for example, punching magnetic steel plates each having a thickness of from about 0.1 mm to about 0.7 mm into a predetermined shape, and laminating a predetermined number of the magnetic steel plates while fastening the magnetic steel plates at caulked portions. In this case, as an example, the magnetic steel plates each having a thickness of 0.35 mm are used.

The stator core 17 has nine slot portions 9 radially formed on a radially inner side thereof at substantially equal intervals in the circumferential direction. Further, a region between the adjacent slot portions 9 in the stator core 17 is referred to as the tooth portion 7. Each of the tooth portions 7 extends in a radial direction, and protrudes toward the rotation center line CL. Further, a most pare of the tooth portion 7 has a substantially constant width in the circumferential direction over a range from a radially outer side to a radially inner side. However, a distal end portion of the tooth portion 7, which is located on the radially innermost side, has a tooth tip portion 7a. Each tooth tip portion 7a is formed into an umbrella shape with its both side portions expanding in the circumferential direction.

The stator winding (not shown) forming a coil (not shown) configured to generate a rotational magnetic field is wound around the tooth portion. The coil is formed by directly winding a magnet wire around the magnetic pole tooth through intermediation of an insulator. This winding method is referred to as a concentrated winding. The coil is connected in three-phase Y connection. The number of turns and a wire diameter of the coil are determined depending on required characteristics (number of revolutions, torque, and the like), the voltage specifications, and the sectional area of the slot. In this case, in order to facilitate the winding, separated teeth are developed in a band shape, and, for example, a magnet wire having a wire diameter φ of from about 0.8 mm to about 1.0 mm is wound around each of the magnetic pole teeth by about 50 turns to about 100 turns. After the winding, the separated teeth are rounded into an annular shape and welded, to thereby form the stator.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by, for example, punching magnetic steel plates each having a thickness of from about 0.1 mm to about 0.7 mm into a predetermined shape, and laminating a predetermined number of the magnetic steel plates serving as plate members while fastening the magnetic steel plates at caulked portions to be described later. In this case, as an example, the magnetic steel plates each having a thickness of 0.35 mm are used. Inter-pole thin portions having a uniform thickness are each secured between a rotor outer peripheral surface 25 and a side-end insertion hole contour surface 57 described later. Those inter-pole thin portions each serve as a path for a leakage magnetic flux between the adjacent magnetic poles, and hence it is preferred that the inter-pole thin portion have a thickness as small as possible. In this case, as an example, the inter-pole thin portion is set to 0.35 mm, which is approximately as large as the thickness of the magnetic steel plate, as the minimum width that allows press work.

A plurality of permanent magnets 19 (six permanent magnets 19 in this specific example), which are magnetized so that the N poles and the S poles are alternately positioned, are arranged in the rotor core 11. Referring to FIG. 1, each of the permanent magnets 19 is curved into an arc shape and arranged so that a convex portion side of the arc shape faces the center side of the rotor 5. In more detail, magnet insertion holes 21 as many as the number of the plurality of permanent magnets 19 are formed in the rotor core 11. The corresponding permanent magnets 19 are inserted into a plurality of the magnet insertion holes 21, respectively. That is, the plurality of permanent magnets 19 and the plurality of magnet insertion holes 21 are each formed into an arc shape that is convex toward the center side of the rotor 5. Further, as illustrated in FIG. 1, one permanent magnet 19 is inserted into one magnet insertion hole 21. Note that, the number of magnetic poles of the rotor 5 may be any number as long as the number is two or more. The case of six poles is exemplified in this embodiment.

In the present invention, at least one slit and at least one caulked portion are required to be formed between the rotor outer peripheral surface of the rotor and a radially-outer insertion hole contour surface of the magnet insertion hole, which is described later. In the first embodiment, as one example thereof, a plurality of (more specifically, three) slits 72 and one caulked portion 76 are formed for each of six magnetic poles.

Next, mainly referring to FIG. 2, details of the permanent magnets and the magnet insertion holes are described. The permanent magnets 19 each have a radially-inner magnet contour surface 43, a radially-outer magnet contour surface 45, and a pair of side-end magnet contour surfaces 47. Further, the magnet insertion holes 21 each have a radially-inner insertion hole contour surface 53, a radially-outer insertion hole contour surface 55, and a pair of side-end insertion hole contour surfaces 57.

The radially-outer insertion hole contour surface 55 is formed by a first arc surface having a first arc radius. The radially-inner insertion hole contour surface 53 is formed by a second arc surface having a second arc radius larger than the first arc radius. The first arc radius and the second arc radius have a common radius center, and the common radius center is located on the radially outer side with respect to the permanent magnet 19 and the magnet insertion hole 21 and on a corresponding magnetic pole center line ML. In other words, the radially-inner insertion hole contour surface 53 and the radially-outer insertion hole contour surface 55 are formed concentrically. The center of the first arc surface and the center of the second arc surface coincide with an orientation, center (orientation focal point) of the permanent magnet.

Further, in FIG. 2, the pair of side-end magnet contour surfaces 47 each connect together corresponding end portions of the radially-inner magnet contour surface 43 and the radially-outer magnet contour surface 45. In FIG. 2, the pair of side-end insertion hole contour surfaces 57 each connect together corresponding end portions of the radially-inner insertion hole contour surface 53 and the radially-outer insertion hole contour surface 55.

Further, referring to FIG. 2 and FIG. 3, details of the slits and the caulked portion are described. The slits 72 all extend in a direction parallel to the corresponding magnetic pole center line ML. The slits 72 are holes passing through the rotor core 11 in a direction of the rotation center line CL. Assuming that a direction orthogonal to the corresponding magnetic pole center line ML is defined as a width direction WD, and a width of one slit 72 corresponding to the caulked portion 76 (slit 72a in alignment with a caulked portion) is defined as SW, in the present invention, at least a part of the caulked portion 76 is positioned between a pair of width extended lines WE of the slit 72 corresponding to the caulked portion 76. Further, the state in which at least the part of the caulked portion 76 is positioned (including a state in which a part of the caulked portion 76 is positioned and a state in which the entire caulked portion 76 is positioned) between the pair of width extended lines WE of the slit 72 corresponding to the caulked portion 76 as described above is defined as a state in which the slit 72 and the caulked portion 76 are "in alignment" in the radial direction. In particular, in the first embodiment, the entire caulked portion 76 is positioned between the pair of width extended lines of the corresponding one slit 72 (slit 72a in alignment with a caulked portion).

In the first embodiment, slits 72 (independent slits 72b) not in alignment with the caulked portion 76 are positioned on both sides of the slit 72a in alignment with a caulked portion in the width direction WD. The three slits 72 are separated from each other at equal intervals in the width direction WD. Further, a length of extension of one slit 72a in alignment with a caulked portion is smaller than a length of extension of each of the two independent slits 72b. Further, a width of the caulked portion 76 is smaller than a width of the slit 72a in alignment with a caulked portion. Further, a positional relationship between the slit 72a in alignment with a caulked portion and the caulked portion 76 in an extending direction of the corresponding magnetic pole center line ML is such that the caulked portion 76 is formed on the radially inner side with respect to the slit 72a in alignment with a caulked portion. A center line of the slit 72a in alignment with a caulked portion in the width direction and a center line of the caulked portion 76 in the width direction are aligned on the same line. In addition, the three slits 72 and the one caulked portion 76 are arranged to be line symmetric with respect to the corresponding magnetic pole center line ML as the center.

According to the interior permanent magnet motor of the first embodiment, which is constructed as described above, the following advantages are obtained. First, in FIG. 4, a rotor without slits is illustrated. In such a rotor without slits, when a magnetic flux is generated in the stator, due to the magnetic flux of the stator, an attraction force acts in portions of the core of the rotor on the radially outer side with respect to the magnet insertion holes. This force causes vibration and noise. Thus, it is desired to reduce the attraction force acting in the vicinity of the outer peripheral surface of the rotor to the extent possible.

Figure 5:
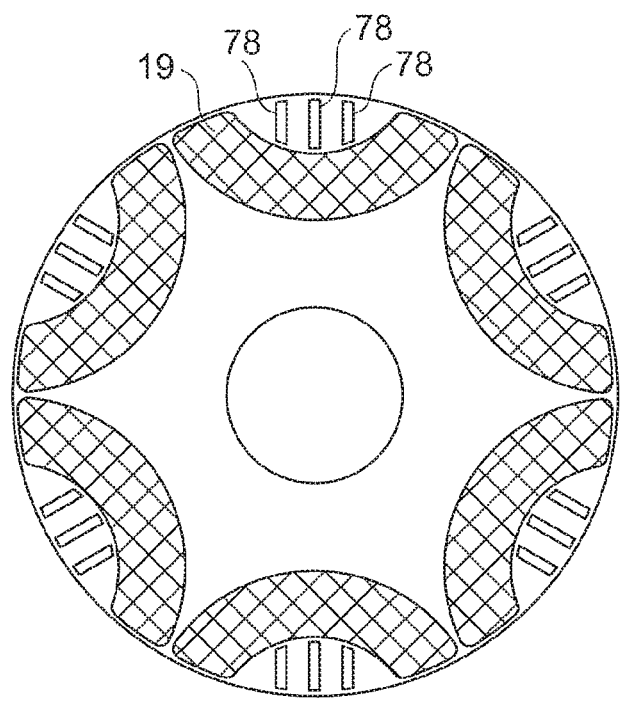
FIG. 5 is a view for illustrating a rotor having slits formed therein.

In view of the above, as illustrated in FIG. 5, it is effective to form slits 78 in each of the portions of the core of the rotor on the radially outer side with respect to the magnet insertion holes. The attraction force is not generated in portions corresponding to the slits 78, and hence the attraction force acting during the rotation of the rotor is reduced. As a result, noise and vibration can be reduced.

Figure 4:
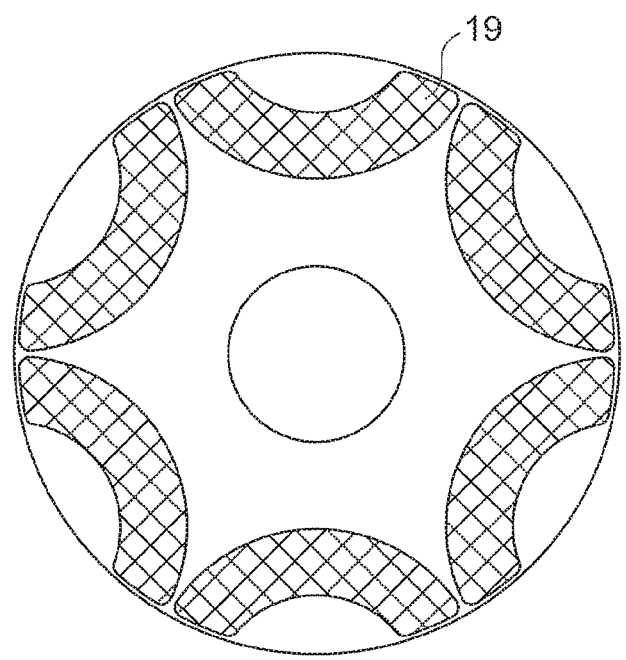
FIG. 4 is a view for illustrating a rotor without slits.
Figure 6:
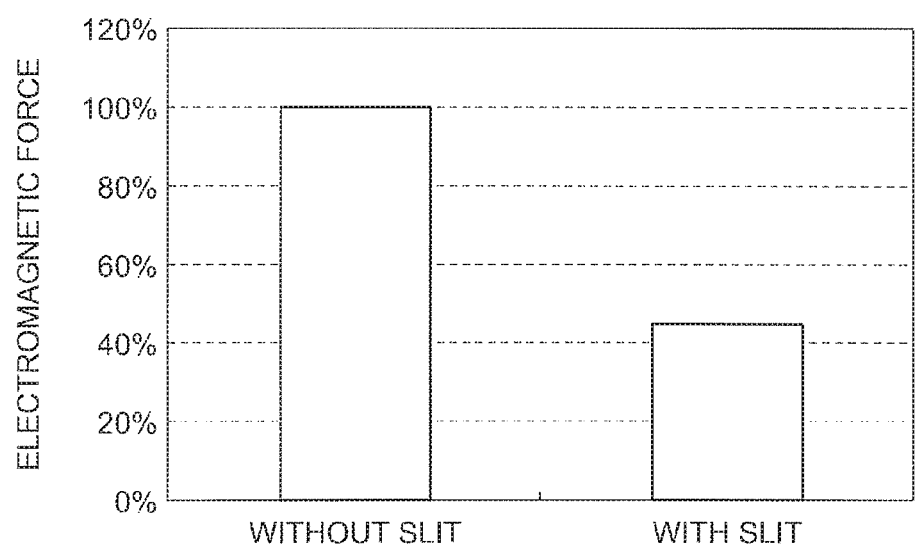
FIG. 6 is a graph for showing a result of analyzing electromagnetic forces in the rotor illustrated in FIG. 4 and the rotor illustrated in FIG. 5.
Figure 7:
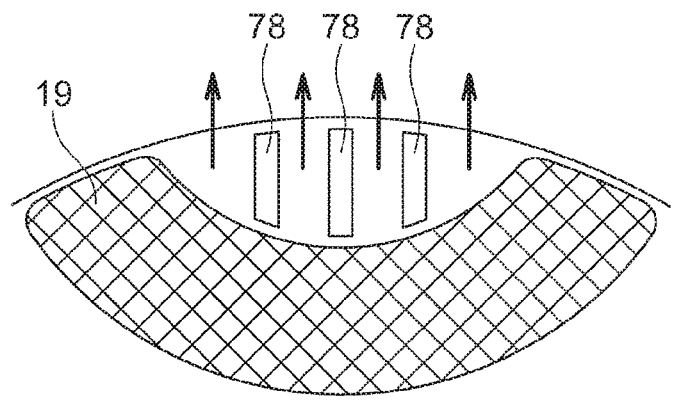
FIG. 7 is a view for schematically illustrating magnetic paths (paths of a magnetic flux) of the rotor illustrated in FIG. 5 by using the arrows.

In FIG. 6, a result of analyzing electromagnetic forces (fundamental components) (which may cause noise) generated when driving the rotor illustrated in FIG. 4 and the rotor illustrated in FIG. 5 under the same operation condition is shown. Assuming that the electromagnetic force in the rotor without slits illustrated in FIG. 4 is 100%, as understood from the result, the electromagnetic force in the rotor with the slits illustrated in FIG. 5 is about 40%. It is understood that noise is reduced by additionally forming the slits. In this case, in order to further reduce noise, it is desired to enlarge the slits. However, as indicated by the arrows of FIG. 7, the magnetic flux of the magnet inserted into the rotor illustrated in FIG. 5 passes through portions other than the slits. When the slits are enlarged, a width of portions serving as magnetic paths is reduced accordingly, which causes reduction of the magnetic force of the rotor, thus leading, to degradation of the efficiency. Therefore, it is important to keep such a balance that the slits are formed in a level that may not reduce the magnetic force of the rotor.

However, on the other hand, in order to more effectively fix members constructing the rotor, the arrangement of the caulked portion is required to be considered. When the caulked portion is formed on the radially outer side of the rotor, opening of the core is more effectively suppressed. Therefore, when a caulked portion 79 is to be formed in the rotor illustrated in FIG. 5 from this viewpoint, the caulked portion 79 is naturally formed between the slits 78 as illustrated in FIG. 8.

Figure 8:
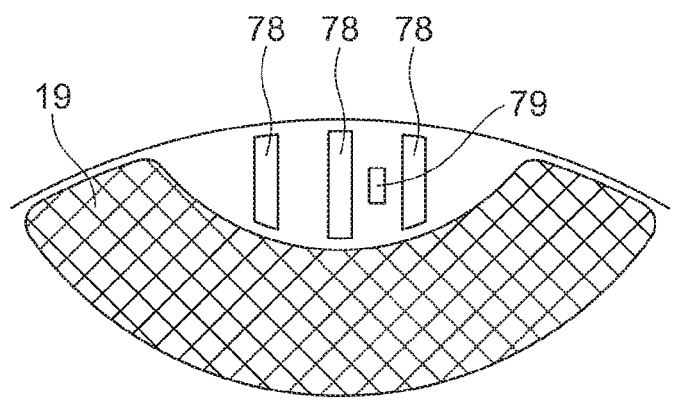
FIG. 8 is a view for illustrating a configuration in which a caulked portion is further added in the rotor illustrated in FIG. 5.

However, when the caulked portion 79 is formed between the pair of slits 78 as illustrated in FIG. 8, the magnetic force is undesirably reduced.

Figure 9:
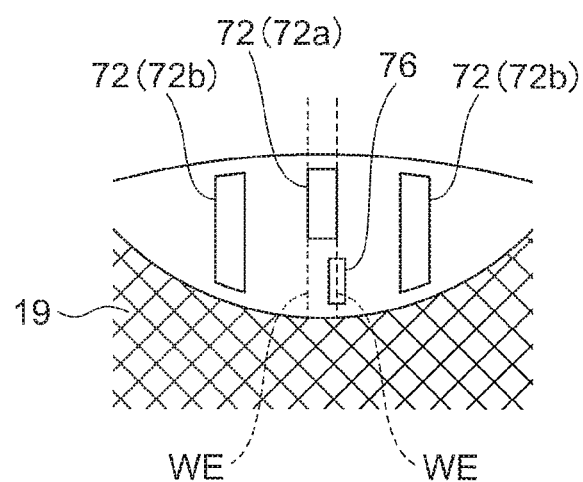
FIG. 9 is a view for illustrating a case where at least a part of a caulked portion is positioned between a pair of width extended lines of the slit.
Figure 10:
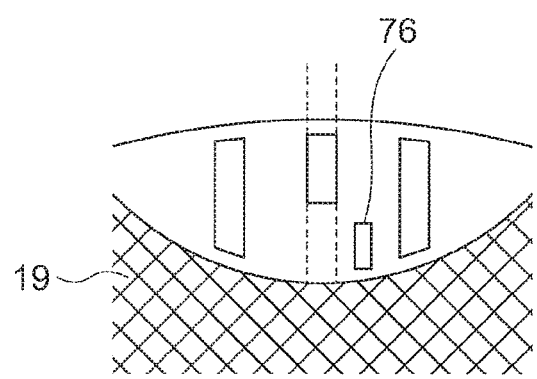
FIG. 10 is a view for illustrating a case where the entire caulked portion is not positioned between the pair of width extended lines of the slit.

In view of the above, in the present invention, as illustrated in FIG. 9, at least the part of the caulked portion 76 is positioned between the pair of width extended lines WE of the slit 72. In other words, a state illustrated in FIG. 10, in which the entire caulked portion is not positioned between the pair of width extended lines of the slit, is avoided. In the first embodiment, as one mode thereof, as illustrated in FIG. 3, the entire caulked portion 76 is positioned between the pair of width extended lines WE of the slit 72. With this, the reduction of the magnetic force can be suppressed in accordance with the area of a portion of the caulked portion, which is positioned in the range of the width of the slit. In particular, in the first embodiment having the configuration illustrated in FIG. 3, the caulked portion 76 can be formed on the radially outer side with respect to the magnet insertion hole 21 without occupying the magnetic path between the adjacent slits 72. Therefore, the plate members constructing the rotor can be fixed more effectively at the caulked portions, and noise and vibration can be reduced.

Figure 11:
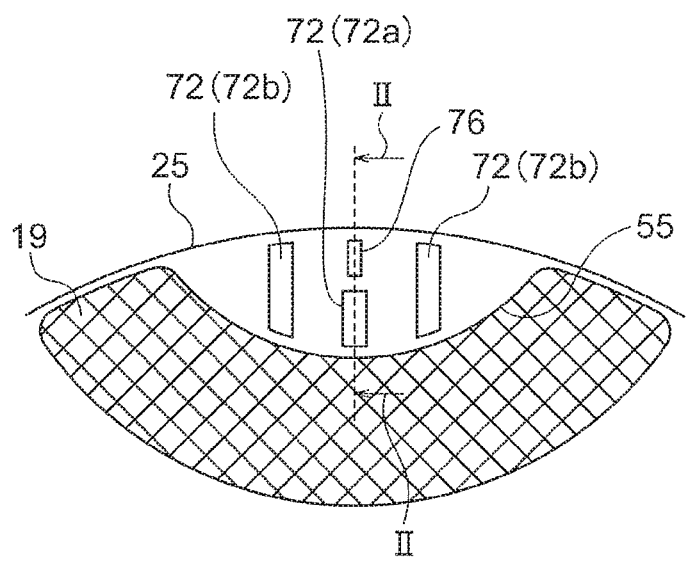
FIG. 11 is a view for illustrating a mode in which the caulked portion is formed on a radially outer side with respect to the slit.

Further, as one mode of the present invention in which at least the part of the caulked portion 76 is positioned between the pair of width extended lines WE of the slit 72, there is given a mode in which the caulked portion 76 is formed on the radially outer side with respect to the corresponding slit 72 as illustrated in FIG. 11. On the other hand, in the first embodiment, as illustrated in FIG. 3, the caulked portion 76 is formed on the radially outer side with respect to the corresponding slit 72. Both the modes illustrated in FIG. 3 and FIG. 11 have an advantage of being capable of reducing noise and vibration as well as being capable of more effectively fixing the plate members constructing the rotor at the caulked portions. Further, the first embodiment illustrated in FIG. 3 has an advantage over the mode in FIG. 11.

Figure 12:
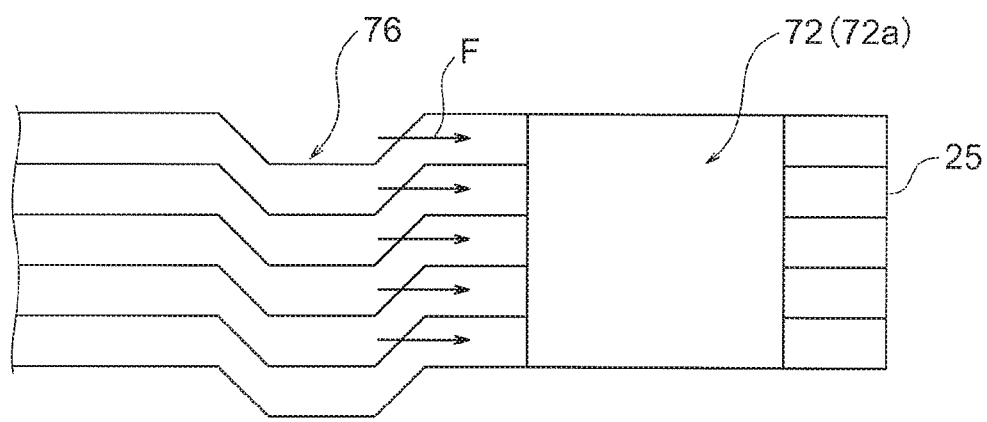
FIG. 12 is a sectional view taken along the line T-T of FIG. 3.
Figure 13:
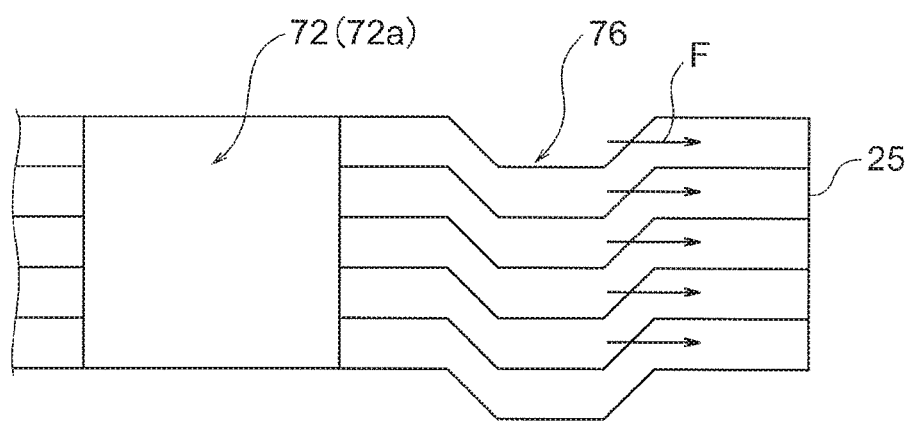
FIG. 13 is a sectional view taken along the line II-II of FIG. 11.

FIG. 12 and FIG. 13 are illustrations of a cross-section taken along the line I-I of FIG. 3 and a cross-section taken along the line II-II of FIG. 11, respectively. The caulked portion 76 of laminated steel sheets can maintain the laminated state by being press-fitted, and stresses act due to the press fitting. Therefore, in the mode in which the caulked portion 76 is formed on the radially outer side with respect to the slit 72, caution is required to be taken so as to prevent slight increase of the outer diameter of the rotor due to stresses F acting in a direction of the radially outer side, which are indicated by the arrows illustrated in FIG. 13. On the other hand, in the mode in which the caulked portion 76 is formed on the radially inner side with respect to the slit 72 as in the first embodiment, stresses F acting in the direction. of the radially outer side, which are indicated by the arrows of FIG. 12, are hardly propagated. to the vicinity of the rotor outer peripheral surface 25 of the rotor due to the presence of the slit 72 (slit 72a in alignment with a caulked portion). Therefore, with the structure itself, an effect of suppressing bulge of the rotor outer peripheral surface, which may be caused due to the press fitting at the caulked portions, can be expected.

Second Embodiment

A second embodiment of the present invention is described. As the second embodiment of the present invention, there is given, for example, as illustrated in FIG. 9, a mode in which at least the part of the caulked portion is positioned between the pair of width extended lines of the slit. Note that, other configurations of the second embodiment are the same as those of the first embodiment.

Third Embodiment

A third embodiment of the present invention is described. As the third embodiment of the present invention, there is given, for example, as illustrated in FIG. 11 and FIG. 13, a mode in which the caulked portion is formed on the radially outer side with respect to the corresponding slit. Note that, other configurations of the third embodiment are the same as those of the first or second embodiment.

Fourth Embodiment

Figure 14:
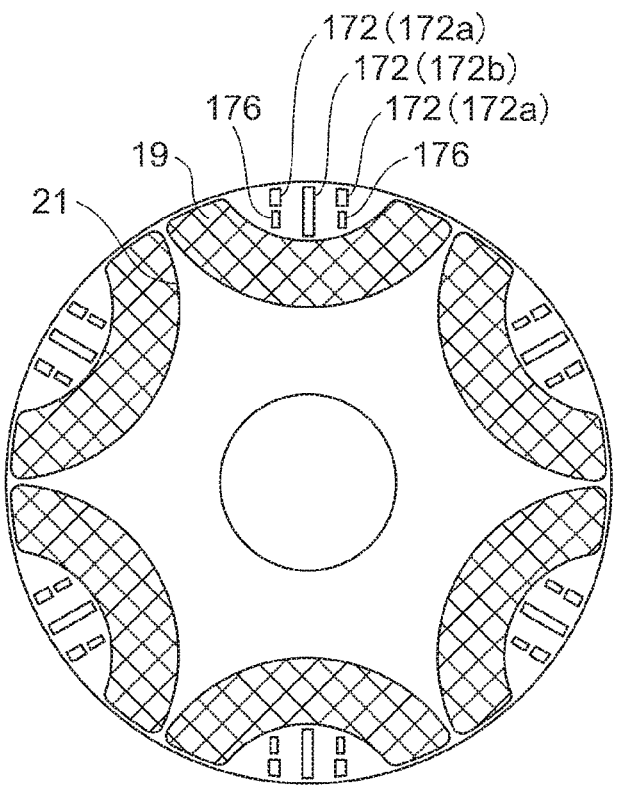
FIG. 14 is a view according to a fourth embodiment of the present invention in the same manner as FIG. 1 for illustrating a rotor portion.
Figure 15:
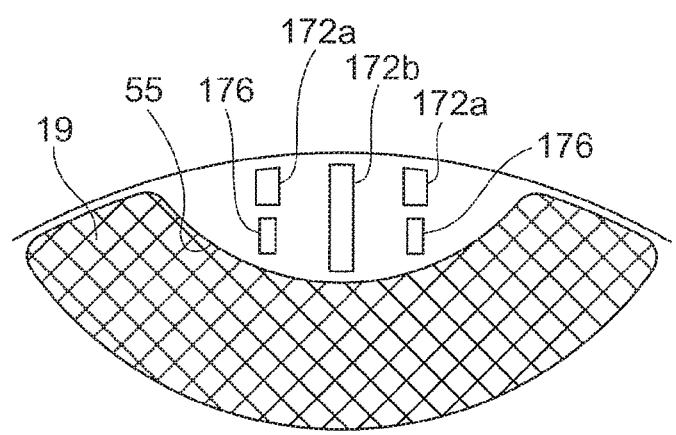
FIG. 15 is a view according to the fourth embodiment in the same manner as FIG. 2.

Next, a fourth embodiment of the present invention is described. The present invention is not limited to the mode in which the caulked portion is located on the magnetic pole center line ML or the mode in which the caulked portion and the slit in alignment with a caulked portion are interposed between a pair of the independent slits. The present invention may be carried out in a mode in which the caulked portion is not located on the magnetic pole center line ML or a mode in which the independent slits are not formed on both sides in the width direction of the caulked portion and the slit in alignment with a caulked portion. FIG. 14 and FIG. 15 are each an example thereof, in which a slit 172 (independent slit 172b) is located on the magnetic pole center line ML, and a pair of caulked portions 176 and a pair of slits 172 (slits 72a in alignment with caulked portions) are formed to be positioned on both sides of the slit 172 (independent slit 172b) in the width direction. Note that, other configurations of the fourth embodiment are the same as those of the first or second embodiment. According to the fourth embodiment, advantages similar to the above-mentioned first or second embodiment are obtained. In addition, the caulked portions are formed on both the sides of each magnetic pole center line ML, and hence the fourth embodiment has an advantage in obtaining an effect of suppressing the opening of the core to a higher degree.

Fifth Embodiment

Figure 16:
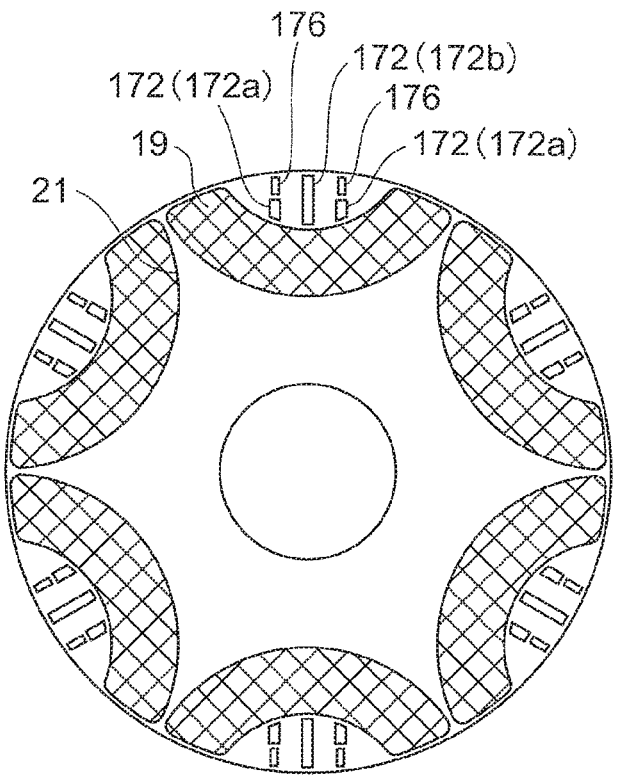
FIG. 16 is a view according to a fifth embodiment of the present invention in the same manner as FIG. 1 for illustrating a rotor portion.
Figure 17:
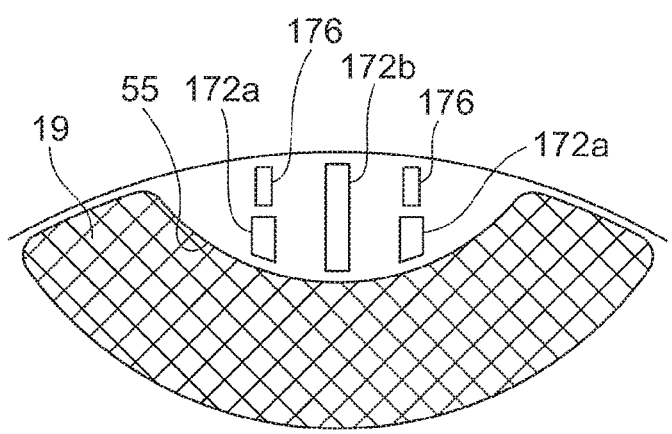
FIG. 17 is a view according to the fifth embodiment in the same manner as FIG. 2.

Next, a fifth embodiment of the present invention is described. In the present invention, the plurality of caulked portions 176 may be provided for one magnetic pole as in the above-mentioned fourth embodiment. In this case, the caulked portions 176 are not limited to be each positioned on the radially inner side with respect to a corresponding slit 172a in alignment with a caulked portion. FIG. 16 and FIG. 17 are each an example thereof, specifically, a mode in which the positional relationship of the radially inner and outer sides is switched between the caulked portions 176 and the slits 172 (slits 172a in a with caulked portions) in the above-mentioned fourth embodiment. Note that, other configurations of the fifth embodiment are the same as those of the fourth embodiment. According to the fifth embodiment, advantages similar to the above-mentioned first or second embodiment are obtained. In addition, the caulked portions are formed on both the sides of each magnetic pole center line ML as in the fourth embodiment, and hence the fifth embodiment has an advantage in obtaining the effect of suppressing the opening of the core to a higher degree. Further, in the fifth embodiment, the caulked portions located on both the sides of each magnetic pole center line ML are arranged on an outer side in the radial direction so that a force for holding the laminated steel sheets is further increased. Thus, more significant quality improvement can be expected.

Sixth Embodiment

Figure 18:
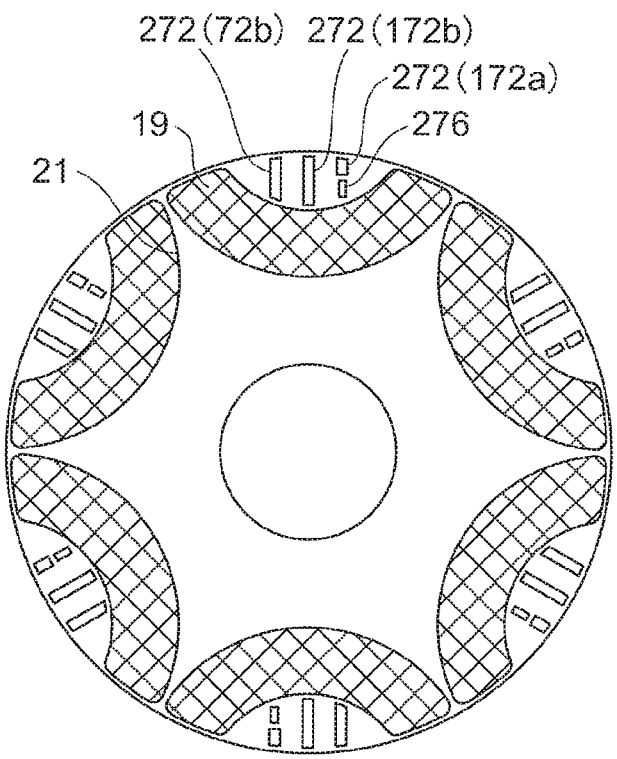
FIG. 18 is a view according to a sixth embodiment of the present invention in the same manner as FIG. 1 for illustrating a rotor portion.
Figure 19:
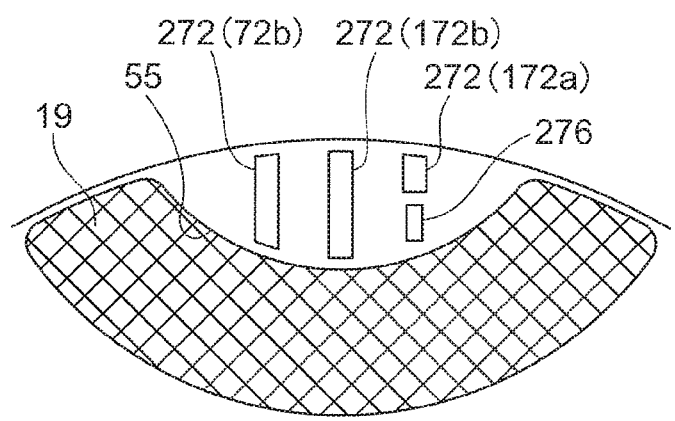
FIG. 19 is a view according to the sixth embodiment in the same manner as FIG. 2.

Next, a sixth embodiment of the present invention is described. The present invention may be carried out in a mode in which both the center of the caulked portion in the width direction and the center of the slit in alignment with a caulked portion in the width direction are displaced from the magnetic pole center line ML, and the independent slit 72b is positioned on the magnetic pole center line ML. FIG. 18 and FIG. 19 are each an example thereof. A slit 272 (independent slit 172b) is located on the magnetic pole center line ML. A slit 272 (independent slit 72b) is located on one side thereof in the width direction, and a slit 272 (slit 172a in alignment with a caulked portion) and a caulked portion 276 are located on the other side. Note that, other configurations of the sixth embodiment are the same as those of the first or second embodiment. According to the sixth embodiment, advantages similar to the above-mentioned first or second embodiment are obtained.

Seventh Embodiment

Figure 20:
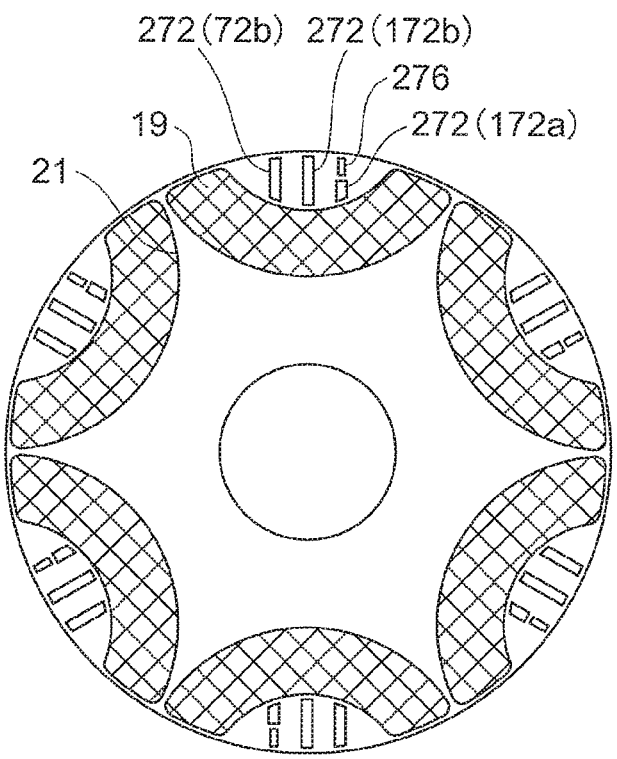
FIG. 20 is a view according to a seventh embodiment of the present invention in the same manner as FIG. 1 for illustrating a rotor portion.
Figure 21:
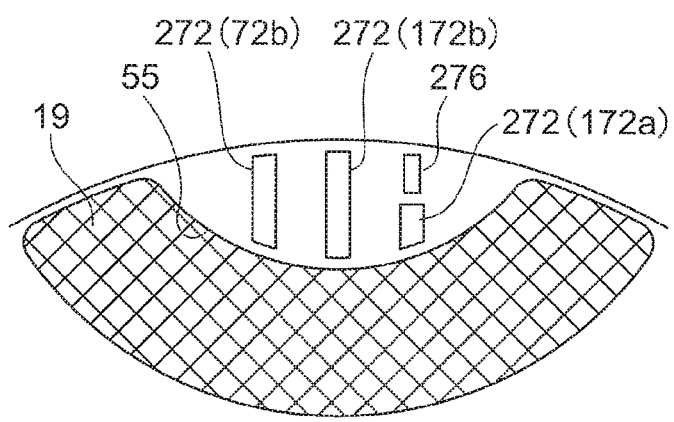
FIG. 21 is a view according to the seventh embodiment in the same manner as that of FIG. 2.

Next, a seventh embodiment of the present invention is described. The seventh embodiment corresponds to a mode in which the positional relationship of the radially inner and outer sides is switched between the caulked portion 276 and the slit 272 (slit 172a in alignment with a caulked portion) in the above-mentioned sixth embodiment as illustrated in FIG. 20 and FIG. 21. Note that, other configurations of the seventh embodiment are the same as those of the sixth embodiment. According to the seventh embodiment, advantages similar to the above-mentioned first or second embodiment are obtained.

Eighth Embodiment

Figure 22:
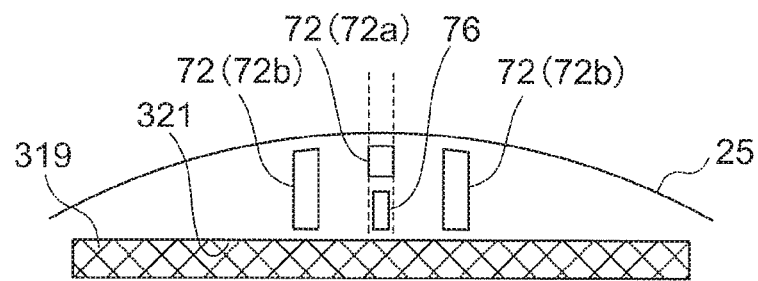
FIG. 22 is a view according to an eighth embodiment of the present invention in the same manner as that of FIG. 2.

An eighth embodiment of the present invention is described. In the eighth embodiment of the present invention, in place of the above-mentioned permanent magnets and magnet insertion holes each having the shape that is convex toward the center side of the rotor, there are provided, for example, as illustrated in FIG. 22, permanent magnets 319 and magnet insertion holes 321 each extending straight when viewed in the cross-section having the rotation center line CL as the normal. In particular, in the illustrated example of FIG. 22, when viewed in the cross-section having the rotation center line CL as the normal, a radially-inner magnet contour surface and a radially-outer magnet contour surface of the permanent magnet 319 and a radially-inner insertion hole contour surface and a radially-outer insertion hole contour surface of the magnet insertion hole 321 extend straight in the direction orthogonal to the corresponding magnetic pole center line ML (width direction WD described above). Further, when viewed in the cross-section having the rotation center line CL as the normal, the radially-inner magnet contour surface and the radially-outer magnet contour surface of the permanent magnet 319 extend in parallel to each other, and the radially-inner insertion hole contour surface and the radially-outer insertion hole contour surface of the magnet insertion hole 321 extend in parallel to each other. Note that, other configurations of the eighth embodiment are the same as those of the first embodiment. Further, similarly to the above-mentioned second embodiment, the eighth embodiment may be modified such that at least the part of the caulked portion is positioned between the pair of width extended lines of the slit.

Ninth Embodiment

Figure 23:
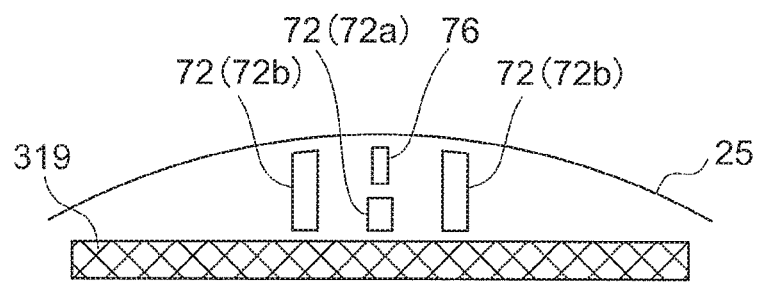
FIG. 23 is a view according to a ninth embodiment of the present invention in the same manner as that of FIG. 2.

A ninth embodiment of the present invention is described. In the ninth embodiment of the present invention, for example, as illustrated in FIG. 23, the permanent magnet 319 and the magnet insertion hole 321 each extending straight are provided, and the caulked portion 76 is formed on the radially outer side with respect to the corresponding slit 72. Note that, other configurations of the third embodiment are the same as those of the first or second embodiment.

Tenth Embodiment

Figure 24:
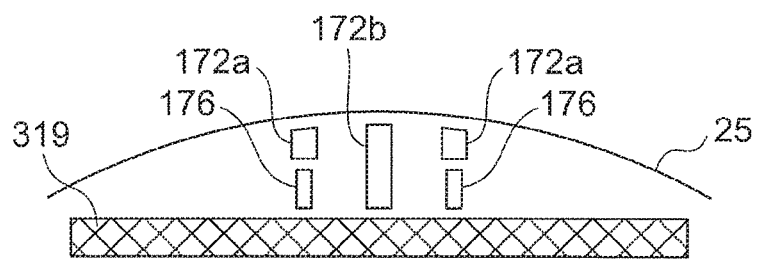
FIG. 24 is a view according to a tenth embodiment of the present invention in the same manner as that of FIG. 2.

Next, a tenth embodiment of the present invention is described. In the tenth embodiment of the present invention, for example, as illustrated in FIG. 24, the permanent magnet 319 and the magnet insertion hole 321 each extending straight are provided. The slit 172 (independent slit 172b) is located on the magnetic pole center line ML, and the pair of caulked portion 176 and a pair of the slits 172 (slits 72a in alignment with caulked portions) are formed to be positioned. on both sides of the slit 172 (independent slit 172b) in the width direction. Note that, other configurations of the tenth embodiment are the same as those of the first or second embodiment. According to the tenth embodiment, similarly to the above-mentioned fourth embodiment, the caulked portions are formed on both the sides or each magnetic pole center line ML, and hence the tenth embodiment has an advantage in obtaining an effect. of suppressing the opening of the core to a higher degree.

Eleventh Embodiment

Figure 25:
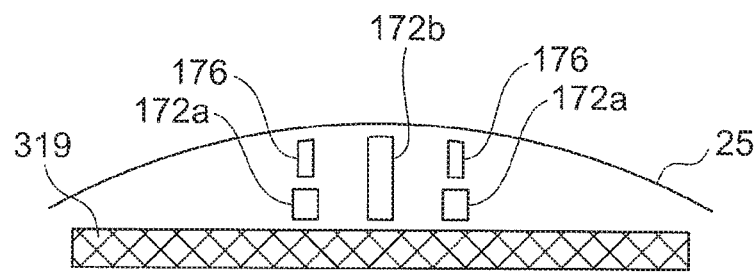
FIG. 25 is a view according to an eleventh embodiment of the present invention in the same manner as that of FIG. 2.

Next, an eleventh embodiment of the present invention is described. In the eleventh embodiment of the present invention, for example, as illustrated in FIG. 25, the permanent magnet 319 and the magnet insertion hole 321 each extending straight are provided. Further, the eleventh embodiment corresponds to a mode in which the positional relationship of the radially inner and outer sides is switched between the caulked portions 176 and the slits 172 (slits 172a in alignment, with caulked portions) from the above-mentioned tenth embodiment. Note that, other configurations of the eleventh embodiment are the same as those of the tenth embodiment. According to the eleventh embodiment, advantages similar to the above-mentioned first or second embodiment are obtained. In addition, the caulked portions are formed on both the sides of each magnetic pole center line ML as in the tenth embodiment, and hence the eleventh embodiment has an advantage in obtaining the effect of suppressing the opening of the core to a higher degree. Further, in the eleventh embodiment, the caulked portions located on both the sides of each magnetic pole center line ML are arranged on the outer side in the radial direction so that the force for holding the laminated steel sheets is further increased. Thus, more significant quality improvement can be expected.

Twelfth Embodiment

Figure 26:
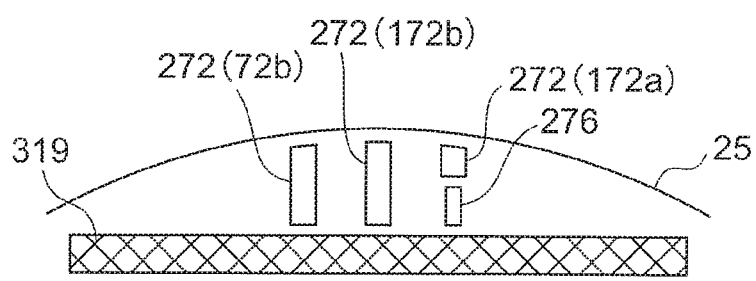
FIG. 26 is a view according to a twelfth embodiment of the present invention in the same manner as that of FIG. 2.

Next, a twelfth embodiment of the present invention is described. In the twelfth embodiment of the present invention, for example, as illustrated in FIG. 26, the permanent magnet 319 and the magnet insertion hole 321 each extending straight are provided. The slit 272 (independent slit 172b) is located on the magnetic pole center line ML. The slit 272 (independent, slit 72b) is located on one side thereof in the width direction, and the slit 272 (slit 172a in alignment with a caulked portion) and the caulked portion 276 are located on the other side. Note that, other configurations of the twelfth embodiment are the same as those of the first or second embodiment. According to the twelfth embodiment, advantages similar to the above-mentioned first or second embodiment are obtained.

Thirteenth Embodiment

Figure 27:
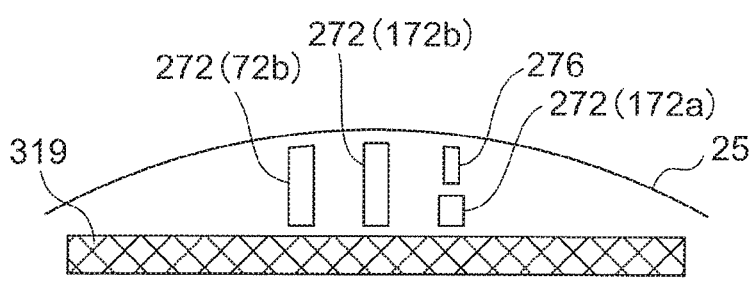
FIG. 27 is a view according to a thirteenth embodiment of the present invention in the same manner as that of FIG. 2.

Next, a thirteenth embodiment of the present invention is described. In the thirteenth embodiment of the present invention, for example, as illustrated in FIG. 27, the permanent magnet 319 and the magnet insertion hole 321 each extending straight are provided. Further, the thirteenth embodiment corresponds to a mode in which the positional relationship of the radially inner and outer sides is switched between the caulked portion 276 and the slit 272 (slit 172a in alignment with a caulked portion) from the above-mentioned twelfth embodiment. Note that, other configurations of the thirteenth embodiment are the same as those of the twelfth embodiment. According to the thirteenth embodiment, advantages similar to the above-mentioned first or second embodiment are obtained.

Fourteenth Embodiment

Next, as a fourteenth embodiment of the present invention, there is described a rotary compressor having the interior permanent magnet motor according to any one of the above-mentioned first to thirteenth embodiments mounted therein. Note that, the present invention encompasses a compressor having the interior permanent magnet motor according to any one of the above-mentioned first to thirteenth embodiments mounted therein. However, the type of the compressor is not limited to the rotary compressor.

Figure 28:
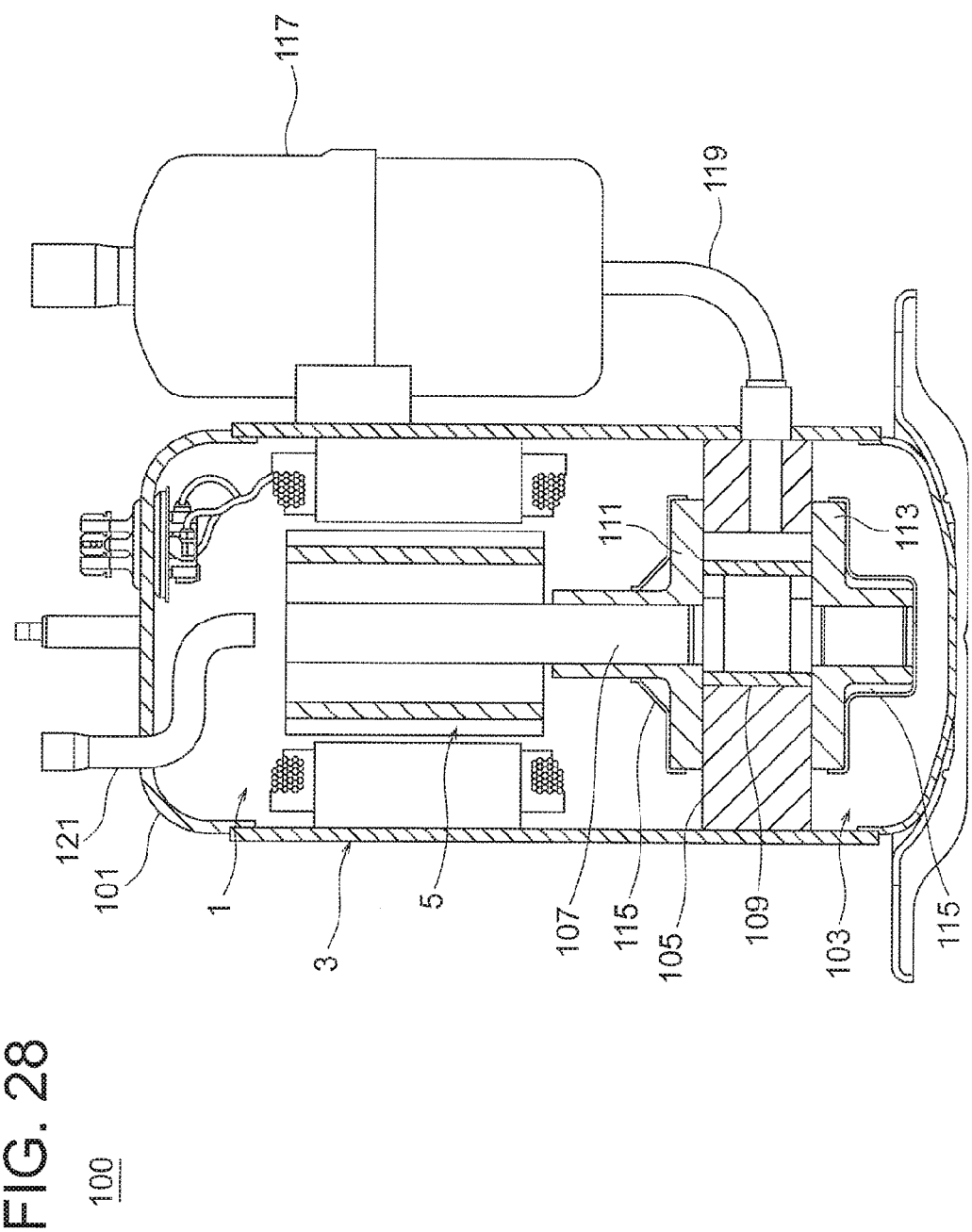
FIG. 28 is a vertical sectional view of a rotary compressor having the interior permanent magnet motor mounted therein according to a fourteenth embodiment of the present invention.

FIG. 28 is a vertical sectional view of the rotary compressor having the interior permanent magnet motor mounted therein. A rotary compressor 100 includes the interior permanent magnet motor 1 (motor element) and a compression element 103 in an airtight container 101. Although not illustrated, a refrigerating machine oil for lubricating each of sliding portions of the compression element 103 is stored in a bottom portion of the airtight container 101.

The compression element 103 includes, as main components thereof, a cylinder 105 arranged in a vertically stacked state, a rotary shaft 107 serving as a shaft rotated by the interior permanent magnet motor 1, a piston 109 to be fitted by insertion into the rotary shaft 107, a vane (not shown) dividing an inside of the cylinder 105 into an intake side and a compression side, an upper frame 111 and a lower frame 113 being a pair of upper and lower frames into which the rotary shaft 107 is to be rotatably fitted by insertion and which are configured to close axial end surfaces of the cylinder 105, and mufflers 115 mounted on the upper frame 111 and the lower frame 113, respectively.

The stator 3 of the interior permanent magnet motor 1 is directly fixed to the airtight container 101 by a method such as shrink fitting or welding and is held thereby. The coil of the stator 3 is supplied with power from a glass terminal fixed to the airtight container 101.

The rotor 5 is arranged through intermediation of an air gap on the radially inner side of the stator 3, and is held in a rotatable state by the bearing portions (upper frame 111 and lower frame 113) of the compression element 103 via the rotary shaft 107 (shaft 13) in the center portion of the rotor 5.

Next, an operation of the rotary compressor 100 is described. A refrigerant gas supplied from an accumulator 117 is taken into the cylinder 105 through an intake pipe 119 fixed to the airtight container 101. The interior permanent magnet motor is rotated by energization of an inverter so that the piston 109 fitted to the rotary shaft 107 is rotated in the cylinder 105. With this, the refrigerant is compressed in the cylinder 105. The refrigerant, which has passed through the muffler 115, rises in the airtight container 101. At this time, the refrigerating machine oil is mixed into the compressed refrigerant. When the mixture of the refrigerant and the refrigerating machine oil passes through air holes formed in the rotor core 11, the refrigerant and the refrigerating machine oil are promoted to be separated from each other, and hence the refrigerating machine oil can be prevented from flowing into a discharge pipe 121. In this manner, the compressed refrigerant is supplied on a high-pressure side of the refrigeration cycle through the discharge pipe 121 arranged on the airtight container 101.

Note that, as the refrigerant for the rotary compressor 100, R410A, R407C, R22, or the like that has hitherto been used may be used, but any refrigerant such as a refrigerant having a low global warming potential (GWP) can also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf (CF3CF=CH2) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practical.

Also in the rotary compressor according to the fourteenth embodiment, which is constructed as described above, when the above-mentioned interior permanent magnet motor is used, advantages similar to the advantages of any one of the corresponding first to thirteenth embodiments described above are obtained.

Fifteenth Embodiment

Further, the present invention may be carried out as a refrigeration and air conditioning apparatus including the compressor according to the above-mentioned fourteenth embodiment as a component of a refrigeration cycle. Note that, configurations of components other than the compressor of the refrigeration cycle of the refrigeration and air conditioning apparatus are not particularly limited.

In the above, the details of the present invention are specifically described referring to the preferred embodiments. However, it is apparent to those skilled in the art that various modifications may be made based on the basic technical concept and the teachings of the present invention.

REFERENCE SIGNS LIST

1 interior permanent magnet motor, 3 stator, 5 rotor, 11 rotor core, 19 permanent magnet, 21 magnet insertion hole, 25 rotor outer peripheral surface, 55 radially-outer insertion hole contour surface, 72, 172, 272 slit, 72a, 172a slit in alignment with caulked portion, 72b, 172b independent slit, 76, 176, 276 caulked portion, 100 rotary compressor, 101 airtight container, 103 compression element, 105 cylinder, ML magnetic pole center line, WE width extended line

The invention claimed is:

1. An interior permanent magnet motor, comprising:
a stator; and
a rotor rotatably arranged so as to be opposed to the stator,
wherein the rotor comprises a rotor core formed by laminating a plurality of plate members,
wherein the rotor core has a plurality of magnet insertion holes formed therein, into which corresponding permanent magnets are respectively inserted,
wherein at least one slit and at least one caulked portion are formed between a rotor outer peripheral surface of the rotor and a radially-outer insertion hole contour surface of the magnet insertion hole, and
wherein at least a part of the caulked portion is positioned between a pair of width extended lines of the slit.

2. An interior permanent magnet motor according to claim 1, wherein the plurality of magnet insertion holes are each formed into a shape that is convex toward a center side of the rotor.

3. An interior permanent magnet motor according to claim 1, wherein the entire caulked portion is positioned between the pair of width extended lines of the slit.

4. An interior permanent magnet motor according to claims 1,
wherein a plurality of the slits are formed between the rotor outer peripheral surface of the rotor and the radially-outer insertion hole contour surface of the magnet insertion hole, and
wherein the plurality of the slits are arrayed in a width direction.

5. An interior permanent magnet motor according to claims 1, wherein the caulked portion is formed on a radially inner side with respect to the corresponding slit.

6. A compressor, comprising, in an airtight container:
a motor; and
a compression element,
wherein the motor comprises the interior permanent magnet motor of claim 1.

7. A refrigeration and air conditioning apparatus, comprising the compressor of claim 6 as a component of a refrigeration cycle.

* * * * *